(12) United States Patent
Orlando et al.

(10) Patent No.: US 7,510,371 B2
(45) Date of Patent: Mar. 31, 2009

(54) FORWARD TILTED TURBINE NOZZLE

(75) Inventors: Robert Joseph Orlando, West Chester, OH (US); Thomas Ory Moniz, Loveland, OH (US); Ching-Pang Lee, Cincinnati, OH (US); David Glenn Cherry, Loveland, OH (US); Robert John Beacock, Cincinnati, OH (US); William Larson Clifford, Cincinnati, OH (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 11/145,837

(22) Filed: Jun. 6, 2005

(65) Prior Publication Data

US 2006/0275111 A1 Dec. 7, 2006

(51) Int. Cl.
*F04D 29/44* (2006.01)
(52) U.S. Cl. ........................................ 415/191; 415/193
(58) Field of Classification Search ................. 415/191, 415/192, 193, 194, 208.1, 209.1
See application file for complete search history.

(56) References Cited

U.S. PATENT DOCUMENTS

| | | | |
|---|---|---|---|
| 2,662,553 A | 12/1953 | Dimmock | |
| 2,724,546 A | 11/1955 | Barrett et al. | |
| 2,766,963 A | 10/1956 | Zimmerman | |
| 2,931,625 A | 4/1960 | Lechthaler et al. | |
| 3,635,586 A | 1/1972 | Kent et al. | |
| 3,807,891 A | 4/1974 | McDow et al. | |
| 3,823,553 A | 7/1974 | Smith | |
| 3,854,842 A | 12/1974 | Caudill | |
| 4,131,387 A | 12/1978 | Kazin et al. | |
| 4,277,225 A | 7/1981 | Dubois et al. | |
| 4,543,036 A | 9/1985 | Palmer | |
| 4,553,901 A | 11/1985 | Laurello | |
| 4,714,407 A | 12/1987 | Cox et al. | |
| 4,826,400 A | 5/1989 | Gregory | |
| 5,131,814 A | 7/1992 | Przytulski et al. | |
| 5,207,556 A | 5/1993 | Frederick et al. | |
| 5,327,716 A | 7/1994 | Giffin et al. | |
| 5,354,174 A | 10/1994 | Balkcum et al. | |
| 5,357,744 A | 10/1994 | Czachor et al. | |
| 5,443,590 A | 8/1995 | Ciokajlo et al. | |
| 5,569,018 A | 10/1996 | Mannava et al. | |
| 5,741,117 A | 4/1998 | Clevenger et al. | |
| 5,996,331 A | 12/1999 | Palmer | |

(Continued)

OTHER PUBLICATIONS

Sharma et al, "Energy Efficient Engine, Low-Pressure Turbine Subsonic Cascade, Component Development and Integration Program," NASA CR-165592, Jan. 1982, pp. Cover, i, iii-xi, 1-17 and 79.

(Continued)

*Primary Examiner*—Edward Look
*Assistant Examiner*—Dwayne J White
(74) *Attorney, Agent, or Firm*—William S. Andes; Francis L. Conte

(57) ABSTRACT

A turbine nozzle includes a row of vanes joined to radially outwardly inclined outer and inner bands. Each vane has camber and an acute twist angle for imparting swirl in combustion gases discharged at trailing edges thereof. The trailing edges are tilted forwardly from the inner band to the outer band for increasing aerodynamic efficiency.

28 Claims, 5 Drawing Sheets

U.S. PATENT DOCUMENTS

| | | | |
|---|---|---|---|
| 6,183,193 | B1 | 2/2001 | Glasspoole et al. |
| 6,353,789 | B1 | 3/2002 | Hanson |
| 6,684,626 | B1 | 2/2004 | Orlando et al. |
| 7,258,525 | B2 * | 8/2007 | Boeck .................... 415/209.3 |
| 2002/0141863 | A1 * | 10/2002 | Liu et al. ................... 415/192 |
| 2003/0163984 | A1 | 9/2003 | Seda et al. |

OTHER PUBLICATIONS

GE Aircraft Engines, "GE/Rolls_Royce JSF F136 Program Details", http://www.geae.com/aboutgeae/presscenter/military/military_20020722g.html, May 31, 2005, 2 pages.

Rolls-Royce, "Trent 900," http://www.rolls-royce.com/civil_aerospace/products/airlines/trent900/technology_flash.jsp, copyright 2004, single page.

Pratt & Whitney, "PW6000," PW6000 http://www.pratt-whitney.com/presskit/images/pw6000_cutaway_high.jpg, website date before, Jun. 1, 2005, single page.

Rolls-Royce, "Trent 900," http://www.rolls-royce.com/civil_aerospace/downloads/airlines/trent_900.pdf, Feb. 2005, single page.

Pratt & Whitney, P & W Energy Efficient Engine, cross section, publicly available in the 1980's, single page.

T. Moniz, U.S. Appl. No. 10/976,495, filed Oct. 29, 2004.

J. Seda et al, U.S. Appl. No. 10/976,523, filed Oct. 29, 2004.

T. Moniz et al, U.S. Appl. No. 10/976,496, filed Oct. 29, 2004.

D.G. Cherry et al, U.S. Appl. No. 11/145,848, filed Jun. 6, 2005.

T.O. Moniz et al, U.S. Appl. No. 11/145,875, filed Jun. 6, 2005.

General Electric Company, GE90 - Turbine Excerpt, on sale or in public in USA more than one year before Jun. 6. 2005; single page.

* cited by examiner

FORWARD TILTED TURBINE NOZZLE

BACKGROUND OF THE INVENTION

The present invention relates generally to gas turbine engines, and, more specifically, to aircraft turbofan engines.

Gas turbine engines have evolved into many configurations for powering various forms of commercial and military aircraft. The typical turbofan engine includes in serial flow communication a fan, compressor, combustor, high pressure turbine (HPF), and low pressure turbine (LPT).

Air enters the engine and is pressurized by the fan and compressor and mixed with fuel in the combustor for generating hot combustion gases. Energy is extracted from the combustion gases in the HPT which powers the compressor through an interconnecting shaft. Additional energy is extracted from the combustion gases in the LPT which powers the fan through a second shaft.

The fan is typically disposed inside a fan nacelle that defines a substantially annular bypass duct around the cowl which surrounds the core engine. Air pressurized by the fan blades is split radially with an inner portion being channeled through the compressor of the core engine, and an outer portion being channeled through the bypass duct, and therefore bypassing the core engine. Propulsion thrust is generated by the pressurized fan air bypassing the core engine as well as by the hot combustion gases discharged from the core engine.

Turbofan engines may be low or high bypass depending upon the amount of fan air bypassing the core engine. Modern turbofan aircraft engines powering commercial aircraft in flight are typically high bypass engines with relatively large, single stage fan blades mounted inside the nacelle and powered by a multistage LPT. The HPT may have a single stage or multiple stages therein and cooperates with the multiple stages of the LPT for maximizing energy extraction from the combustion gases to power the fan and compressor.

The compressor in a modern turbofan engine is typically a multistage axial high pressure compressor directly driven by the rotor or shaft of the HPT. And in some configurations, a multistage, axial booster or low pressure compressor is disposed between the fan and high pressure compressor and joined to the fan shaft or rotor powered by the LPT.

The compressors and turbines have various stages or rows of rotor blades extending radially outwardly from supporting rotor spools or disks joined together by the corresponding rotors or shafts. Each stage or row of rotor blades typically cooperates with an upstream row or stage of stator vanes.

Stator vanes and rotor blades have corresponding airfoil configurations which cooperate for pressurizing the air in the compressor and expanding the combustion gases in the turbines for extracting energy therefrom. Each airfoil has a generally concave pressure side and an opposite, generally convex suction side extending radially in span between axially opposite leading and trailing edges.

The nominal curvature of the airfoil is represented by the camber line extending between the leading and trailing edges. And, the concave pressure side and convex suction side are specifically configured for providing the desired pressure distributions thereover for maximizing efficiency of air compression in the compressor and gas expansion in the turbines.

The rotors of the HPT and LPT typically rotate in the same direction, or co-rotate, and the angular or twist orientation of the vanes and blades in the compressor and turbines typically alternate between the airfoil rows as the flow streams are turned in their tortuous path through the engine.

Each vane and blade row has a corresponding total number of airfoils therein required for efficiently turning the flow streams under the aerodynamic loading therefrom. Each row typically has a substantial number or multitude of airfoils around the circumference thereof dictated by the aerodynamic loading requirements of each stage and the turning or swirling of the flow streams axially therethrough.

For example, a single stage high pressure (HP) turbine typically has a substantial amount of exit swirl of the combustion gases, for example about 25 degrees. Correspondingly, the first stage low pressure (LP) turbine nozzle has vanes with substantial curvature or camber for efficiently turning the high swirl discharge flow from the HPT.

In a two stage HPT, the second stage HP blades typically have corresponding camber and angular orientation or twist relative to the axial centerline axis of the engine for effecting nearly zero swirl at the exit of HPT. Correspondingly, the first stage LP nozzle vanes will have suitable camber and twist for efficiently channeling the combustion gases to the first stage LP blades.

Modern turbofan engines presently used for powering commercial aircraft in flight enjoy high operating efficiency due to the many advancements in design of the various components thereof over many years of development and commercial use in service. Since the engines power aircraft in flight, the size and weight of the engines themselves are ever paramount design objectives along with maximum efficiency of operation. The cost of jet fuel continually increases, and the need to further maximize efficiency of turbofan engines and reduce fuel consumption becomes ever more challenging in modern aircraft engine design.

Accordingly, it is desired to provide a turbofan aircraft engine having further improvement in efficiency in the turbine stages thereof.

BRIEF DESCRIPTION OF THE INVENTION

A turbine nozzle includes a row of vanes joined to radially outwardly inclined outer and inner bands. Each vane has camber and an acute twist angle for importing swirl in combustion gases discharged at trailing edges thereof. The trailing edges are tilted forwardly from the inner band to the outer band for increasing aerodynamic efficiency.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
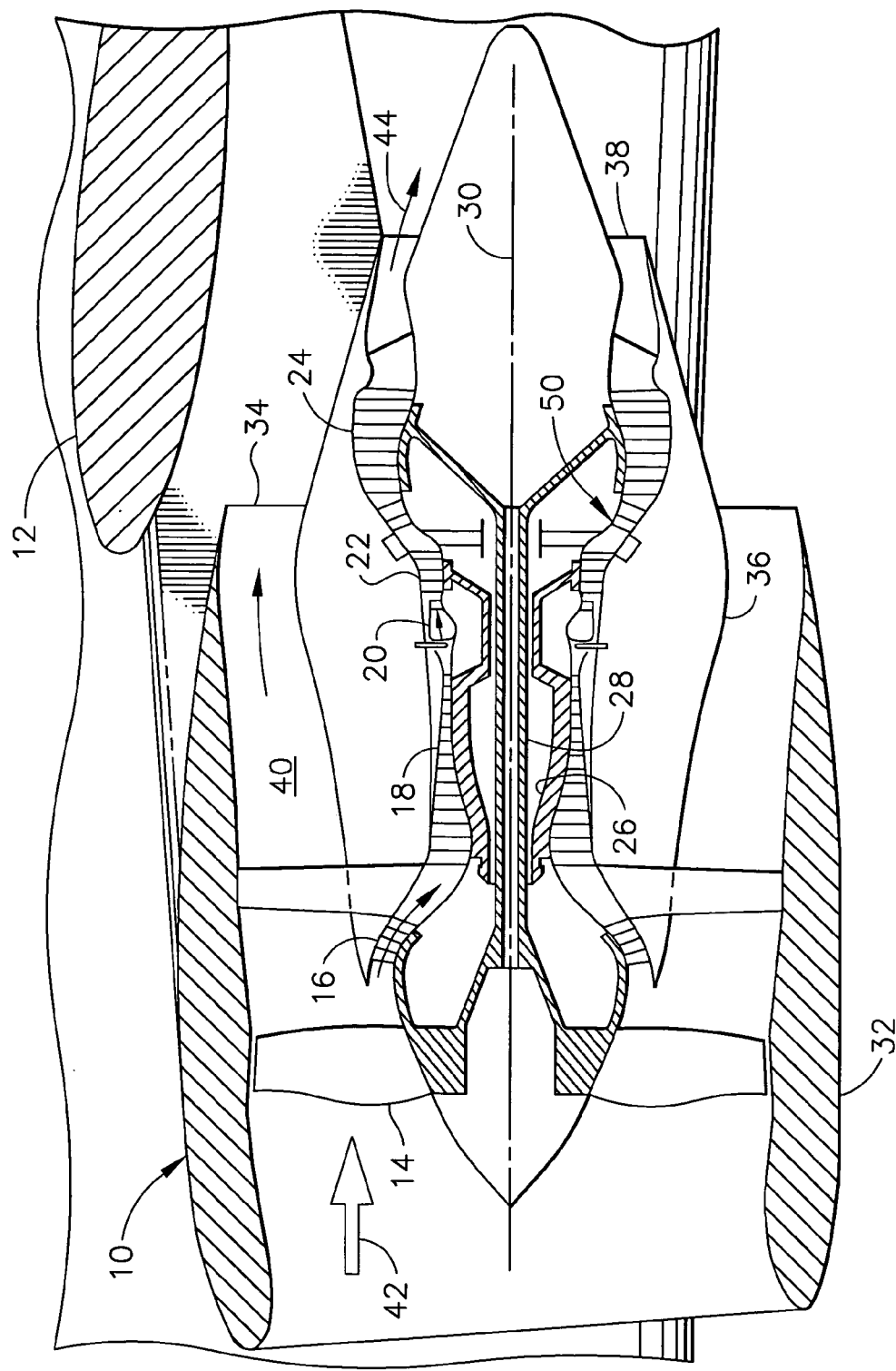
FIG. 1 is a partly sectional axial view of aircraft turbofan gas turbine engine mounted to the wing of aircraft.

Illustrated schematically in FIG. 1 is a turbofan engine 10 mounted to the wing 12 of aircraft for providing propulsion thrust therefor. The engine includes in serial flow communication a fan 14, low pressure or booster compressor 16, multistage high pressure axial compressor 18, annular combustor 20, high pressure turbine (HPT) 22, and multistage low pressure turbine (LPT) 24.

The high pressure compressor 18 is joined to the HPT 22 by a first shaft or rotor 26, and the fan 14 and booster compressor 16 are joined to the LPT 24 by a second shaft or rotor 28 which are concentric with each other, and coaxial about a longitudinal or axial centerline axis 30 of the engine.

A fan nacelle 32 surrounds the fan 14 and extends aft therefrom to terminate at a distal end in a substantially annular fan outlet or nozzle 34. A core cowl 36 surrounds the compressors 16,18, combustor 20, HPT 22, and LPT 24, and has an annular core outlet or nozzle 38 which is spaced downstream or aft from the fan outlet 34.

The fan nacelle 32 is mounted outside the core cowl 36 by a conventional fan frame extending radially therebetween, with the nacelle and cowl being spaced apart radially to define a substantially annular bypass duct 40 terminating at the fan outlet 34 forward or upstream of the core outlet 38.

The basic turbofan engine 10 illustrated in FIG. 1 is conventional in configuration and operation, except as modified and described hereinbelow. During operation, ambient air 42 enters the inlet of the fan nacelle and is pressurized by the row of fan rotor blades in the fan 14. The air is then split radially in outer part through the bypass duct 40 and in inner part through the low and high pressure compressors 16,18 which further pressurize the air sequentially in turn to the combustor 20. Fuel is added to the pressurized air in the combustor and ignited for generating hot combustion gases 44 from which energy is extracted in the HPT 22 and LPT 24.

The exemplary engine has a high bypass ratio for the pressurized fan air 42 channeled through the bypass duct 40. The single stage fan 14 pressurizes the air for producing a majority of the propulsion thrust for the engine through the fan outlet 34. The inner portion of the fan air is further pressurized in the compressors for generating the hot combustion gases which are discharged through the core outlet 38 for providing additional thrust in powering the aircraft in flight.

The engine is axisymmetrical about the axial centerline axis 30 with a full row of fan blades extending radially outwardly from a supporting rotor disk at the forward end of the second rotor 28. The low and high pressure compressors 16,18 include corresponding rows of stator vanes and rotor blades through which the air is sequentially pressurized to the last stage thereof. The rotor blades of the booster compressor 16 are joined to the second shaft 28, whereas the rotor blades of the high pressure compressor 18 are joined to the first rotor 26.

Figure 2:
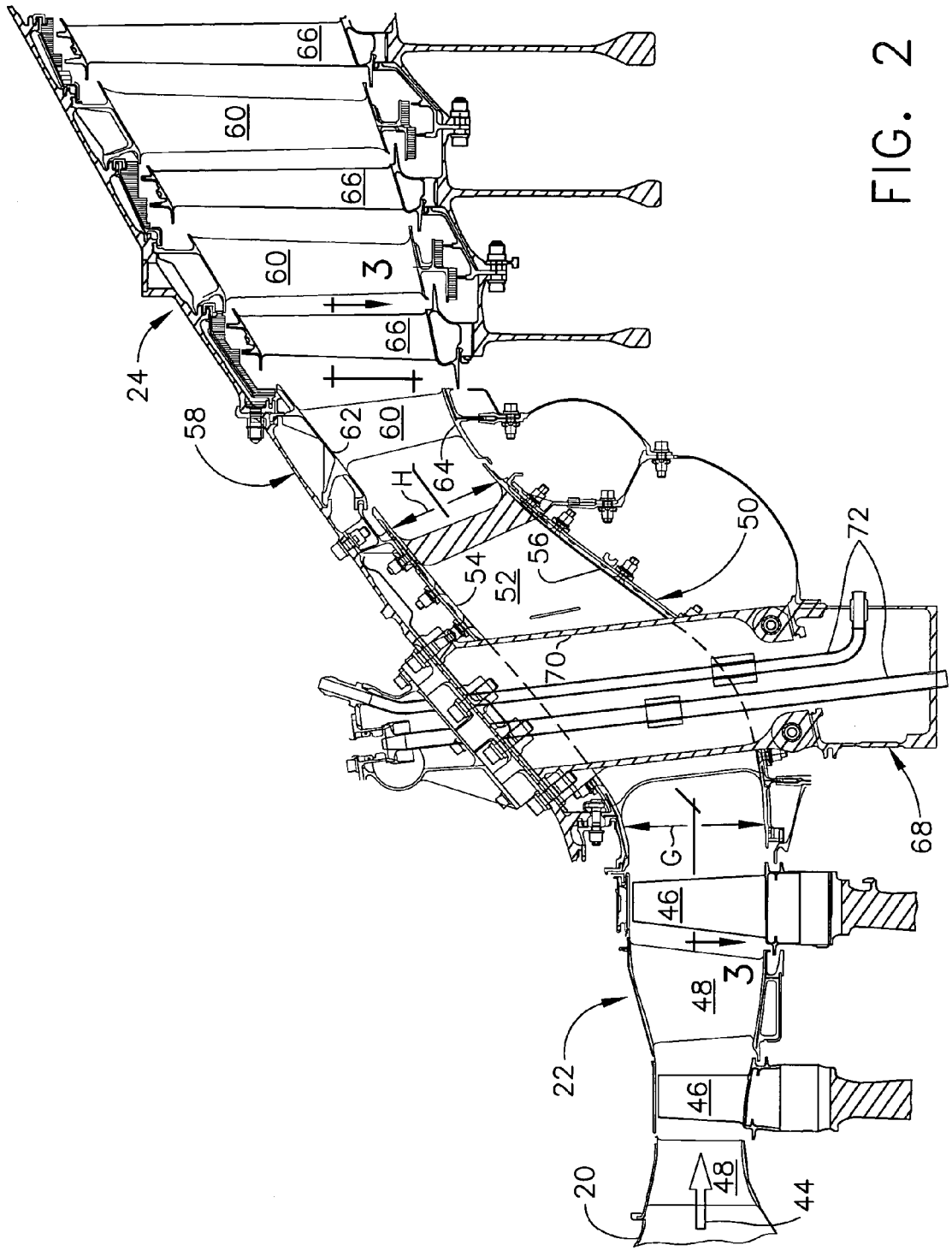
FIG. 2 is an enlarged elevation view of the turbine section of the engine illustrated in FIG. 1.

FIG. 2 illustrates in more detail the turbine section of the engine downstream from the discharge end of the annular combustor 20. The HPT 22 includes two rows or stages of high pressure (HP) rotor blades 46 extending radially outwardly from supporting disks which in turn are joined to the first rotor 26. Correspondingly, the HPT 22 also includes two corresponding turbine nozzles having rows of HP stator vanes 48 mounted radially between outer and inner bands.

The blades 46 and vanes 48 of the HPT 22 have airfoil configurations with generally concave pressure sides, and opposite, generally convex suction sides extending axially in chord between opposite leading and trailing edges, and radially in span over the flowpath through which the combustion gases 44 are channeled axially aft in the downstream direction.

Figure 3:
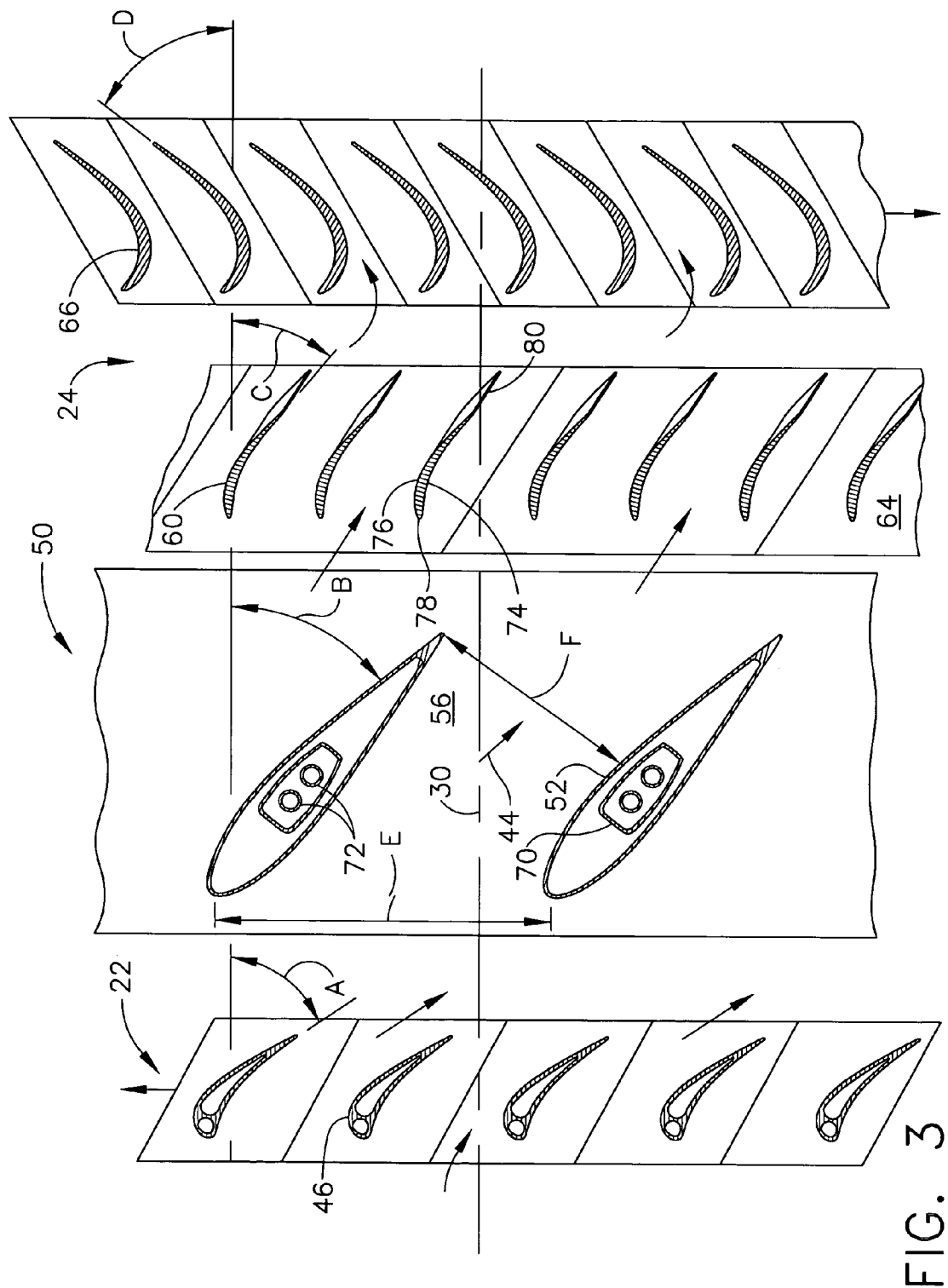
FIG. 3 is a radial planiform view of exemplary airfoils in the turbines illustrated in FIG. 2 and taken along line 3-3.

As shown in FIG. 3, the second or last stage HP blades 46 have arcuate camber and an angular orientation represented by an acute first twist angle A relative to the axial axis 30 for effecting a corresponding, non-zero or acute angle exist swirl in the combustion gases 44 discharged therefrom during operation. FIG. 3 illustrates the physical twist angle A which may be measured on the suction side of the blade at its trailing edge, or may be relative to the mean camber line extending through the center of the blade.

The row of HP blades 46 illustrated in FIG. 3 rotates in a first direction which is clockwise aft-looking-forward in the engine and will discharge the combustion gases with an absolute swirl angle which is non-zero and about 15 degrees in one example.

FIG. 2 illustrates an annular transition duct 50 disposed axially between the HPT 22 and the LPT 24 for providing an aerodynamically efficient transition of the combustion gases therebetween. The duct 50 includes a row of airfoils or fairings 52 extending radially in span between radially outwardly inclined outer and inner bands or platforms 54,56. The fairings are spaced circumferentially apart and define flow passages between the platforms through which the combustion gases are channeled directly from the last stage blades 46 of the HPT 22 and the first stage of the LPT 24. The transition duct 50 is configured to channel the combustion gases from the HPT with corresponding acute swirl to the LPT while enhancing efficiency of the turbines.

The LPT 24 is illustrated schematically in FIG. 1 and includes seven stages in the exemplary embodiment, which cooperate with the two stages of the HPT 22. FIG. 2 illustrates in more detail the first three of the seven stages of the LPT 24, with the four additional stages being similarly configured and typically increasing in size in the downstream direction.

The LPT 24 illustrated in FIG. 2 includes a first stage low pressure (LP) turbine nozzle 58 directly following the transition duct 50 in flow communication therewith. The first stage LP nozzle 58 includes a row of first stage LP stator vanes 60 extending radially in span between annular outer and inner bands 62,64. The first stage LP nozzle 58 is followed directly in turn by a row of first stage LP rotor blades 66 fixedly joined to the second rotor 28 illustrated in FIG. 1.

Since the LPT 24 illustrated in FIG. 2 includes seven exemplary stages, each stage includes a corresponding stator nozzle having vanes 60 extending radially between outer and inner bands suitably supported inside a surrounding casing of the engine. The vanes 60 typically increase in radial span from stage to stage in the downstream direction.

Following each nozzle stage in the LPT is a corresponding row of rotor blades 66 also typically increasing in radial size in the downstream direction. Each row of blades 66 typically extends radially outwardly from a supporting rotor disk with the seven disks of the seven stages being suitably joined together, and further joined to the common second rotor 28 for powering the fan 14 during operation.

As shown in FIG. 3, the LP rotor blades 66 are oriented oppositely to the HP rotor blades 46 for counterrotating the first and second rotors 26,28 to which they are joined. Counterrotation of the rotors in the HPT 22 and LPT 24 permits a substantial increase in aerodynamic efficiency of the LPT itself as well as in the HPT which contribute to increasing the overall efficiency of the counterrotating turbofan aircraft engine illustrated in FIG. 1.

The swirl or angular flow direction of the combustion gases through the different stages of the turbines is effected by the corresponding angular orientation, profiles, and camber of the various airfoils in the flowpath of the combustion gases downstream from the combustor. Swirl is also affected by the velocity or Mach number of the combustion gases as they travel along the flowpath, and is a complex three dimensional flow with axial, tangential, and radial components.

The introduction of counterrotation in the turbines illustrated in FIG. 2 is complemented with the specific configuration and orientation of the transition duct 50 and first stage LP nozzle 58. In particular, the first stage LP nozzle 58 is higher in radial elevation than the HPT 22, including the second stage HP blades 46 therein.

Correspondingly, the transition duct 50 increases in radial elevation and flow area between the HPT 22 and the LPT 24 for maintaining, and preferably increasing, the swirl of the combustion gases as they travel between the HPT and the LPT. The radial elevation and flow area of the transition duct 50 have opposite effects on combustion gas swirl, and are collectively configured as described hereinbelow for preferentially increasing swirl for correspondingly increasing the efficiency of the turbine stages.

Each of the fairings 52 as illustrated in FIG. 3 has an acute second twist angle B, and each of the first stage LP vanes 60 has an acute third twist angle C corresponding in orientation or direction with the first twist angle A of the second stage HP blades 46.

Furthermore, the first stage LP blades 66 have an acute fourth twist angle D oriented oppositely to the twist angle C of the first stage LP vanes 60 for effecting counterrotation of the first and second rotors 26,28. In FIG. 3, the corresponding convex suction sides of the second stage HP blades 46 face upwardly for effecting clockwise rotation of the first rotor 26 aft-looking-forward. Correspondingly, the convex suction sides of the first stage LP blade 66 face downwardly for effecting counterclockwise rotation of the second rotor 28 aft-looking-forward.

The introduction of counterrotation of the two rotors in the turbofan engine permits the first stage LP vanes 60 to aerodynamically unload or reduce their loading since less flow turning is required. Correspondingly, the two stage HPT 22 need not be configured in the conventional manner for achieving substantially zero exit swirl therefrom, but instead is modified for achieving a significant amount of acute angle swirl flow therefrom.

The fairings 52 of the transition duct 50 have the acute twist angle B selected for maintaining and preferably increasing slightly the swirl of the combustion gases as they flow through the transition duct to the first stage LP nozzle 58. Since the fairings 52 are preferably symmetrical for reducing pressure losses, they have limited ability to turn the gas flow.

The twist angle C of the first stage LP vanes 60 corresponds in direction with the twist of the fairings 52 which require relatively little aerodynamic loading and turning of the combustion gases for transition into the counterrotating first stage LP blades 66.

Accordingly, the curvature and camber of the first stage LP vanes 60 may be substantially reduced over that found in a first stage LP nozzle in a turbofan engine having co-rotating rotors for the HPT and LPT.

Furthermore, the counterrotating turbines also permit a substantial reduction in turbine blade count. For example, the second stage HP blades 46 illustrated in FIG. 3 may have a total blade count substantially reduced in the counterrotating configuration as opposed to a co-rotating configuration which is about half of the total vane count of the first stage LP nozzle 58.

The total vane count of the first stage LP vanes 60 may be substantially reduced in the counterrotating configuration as opposed to a corresponding co-rotating configuration. And, the total count of the fairings 52 is substantially less than the blade and vane count, with the total count of the second stage HP blades 46 being about five times the total count of the fairings 52.

For example, there may be about twelve fairings 52 in the transition duct 50, with about five times that number of second stage HP blades 46, and about ten times that number of first stage LP vanes 60 and blades 66 in the corresponding rows. The specific number of blades, vanes, and fairings in these cooperating components is controlled by the intended thrust and efficiency requirements of the turbofan engine, but a substantial reduction of about ten percent in the number of second stage HP blades 46 may be obtained, along with a substantial reduction of fifteen to thirty percent in the number of first stage LP vanes 60 as well.

The reduction in number of airfoil count correspondingly decreases the complexity and weight and cost of the engine, and provides additional benefits in the engine. However, the primary benefit is an increase in aerodynamic efficiency.

Counterrotation of the LPT rotor permits a substantial increase in efficiency in the first stage LP nozzle 58, which in turn permits a corresponding increase in efficiency of the HPT 22 including the second stage HP blades 46 thereof. Accordingly, the aerodynamic cooperation of the HPT 22, transition duct 50, and counterrotating LPT 24 provide a synergistic increase in efficiency, while correspondingly reducing complexity and weight of the engine.

The transition duct 50 illustrated in FIG. 2 provides a convenient location for introducing a midframe 68 that is disposed between the HPT 22 and the LPT 24 and which may be conveniently used for supporting bearings for mounting the rotor shafts. The midframe 68 includes a plurality of hollow struts 70, each of which extends radially through corresponding ones of the fairings 52 as additionally illustrated in FIG. 3.

The fairings 52 are sufficiently wide at the struts 70 and have a generally symmetrical profile which converges from maximum width just behind the leading edge thereof to the narrow trailing edge extending toward the first stage LP nozzle 58. The struts 70 are radially rigid for supporting the rotor bearings, and are hollow for carrying one or more tubes 72 for conveniently carrying conventional fluids through the hot combustion flowpath. For example, the tubes 72 may be used for channeling cooling or purge air into the core engine within the various rotor cavities.

The struts 70 may be located at the forward end of fairings 52, with the fairings extending in axial length to bridge the transition between the HPT and the LPT and the substantial radial increase in elevation shown in FIG. 2.

The fairings 52 illustrated in FIGS. 2 and 3 have leading edges which extend radially between the platforms 54,56 between which is defined an inlet flow area E for each flow passage. Correspondingly, each of the fairings 52 also includes a radially extending trailing edge, with the trailing edge of one fairing defining perpendicularly with an opposing side of the next fairing an outlet flow area F for each passage between the fairings.

As best shown in FIG. 2, the trailing edges of the fairings 52 are preferably disposed higher in radial elevation or height than the leading edges of the fairings, and extend in radial span or height so that the collective outlet flow area of the transition duct is greater than the collective inlet flow area of the transition duct. In this way, the swirl of the combustion gases channeled between the HPT 22 and LPT 24 may be maintained or slightly increased as the combustion gases are channeled and radially expand through the transition duct.

In general, increasing the radius of the transition duct decreases swirl of the combustion gases therein, while increasing the flow area through the transition duct increases swirl therethrough. However, the area increased through the transition duct should not be excessive which would lead to flow separation and a substantial loss in turbine efficiency.

As shown in FIG. 2, the fairings 52 have a radial span or height G at their leading edges between the outer and inner platforms 54,56, and a corresponding radial span or height H at the trailing edges between the platforms. The radial span H of the fairing trailing edges is preferably less than or equal to the radial span G of the fairing leading edges since the outer and inner platforms 54,56 are inclined or sloped radially outwardly in the aft direction. In this way, the increase in outlet area of the radially diverging transition duct may be reduced by decreasing the radial span of the fairing trailing edges.

The transition duct 50 provides a substantial increase in radius of the flowpath between the high and low pressure turbines, with the trailing edges of the fairings 52 at the inner platform 56 being higher in radial elevation than the leading edges of the fairings at the outer platform 54 in the preferred embodiment illustrated in FIG. 2. Correspondingly, the first stage LP nozzle 58 is disposed downstream from the transition duct at an even higher radial elevation which positions the LP nozzle 58 substantially greater in elevation than the HPT 22, including the last stage rotor blades 46 thereof.

Furthermore, the first five stages of the LPT 24, three of which are illustrated in FIG. 2, continue this pattern of increasing radial elevation of vanes 60 and blades 66 thereof in the downstream direction. Both the inner and outer boundaries of the flowpath along the LPT vanes and blades continue to increase in radial elevation for the first five stages thereof before leveling out to the last two stages thereof for further enhancing efficiency of the LPT.

In view of the substantial radial increase in elevation between the HPT 22 and the LPT 24 illustrated in FIG. 2 and the large exit swirl of the combustion gases illustrated in FIG. 3, the first stage LP nozzle 58 plays a greater role in turbine efficiency as the combustion gases undergo considerable radial expansion. Since counterrotation operation of the LPT rotor substantially reduces the turning requirement for the first stage LP nozzle 58, the aerodynamic loading thereof is also reduced, which correspondingly permits a reduction in the axial width of the vanes 60 preferentially effected where they join the radially outer band 62.

Figure 4:
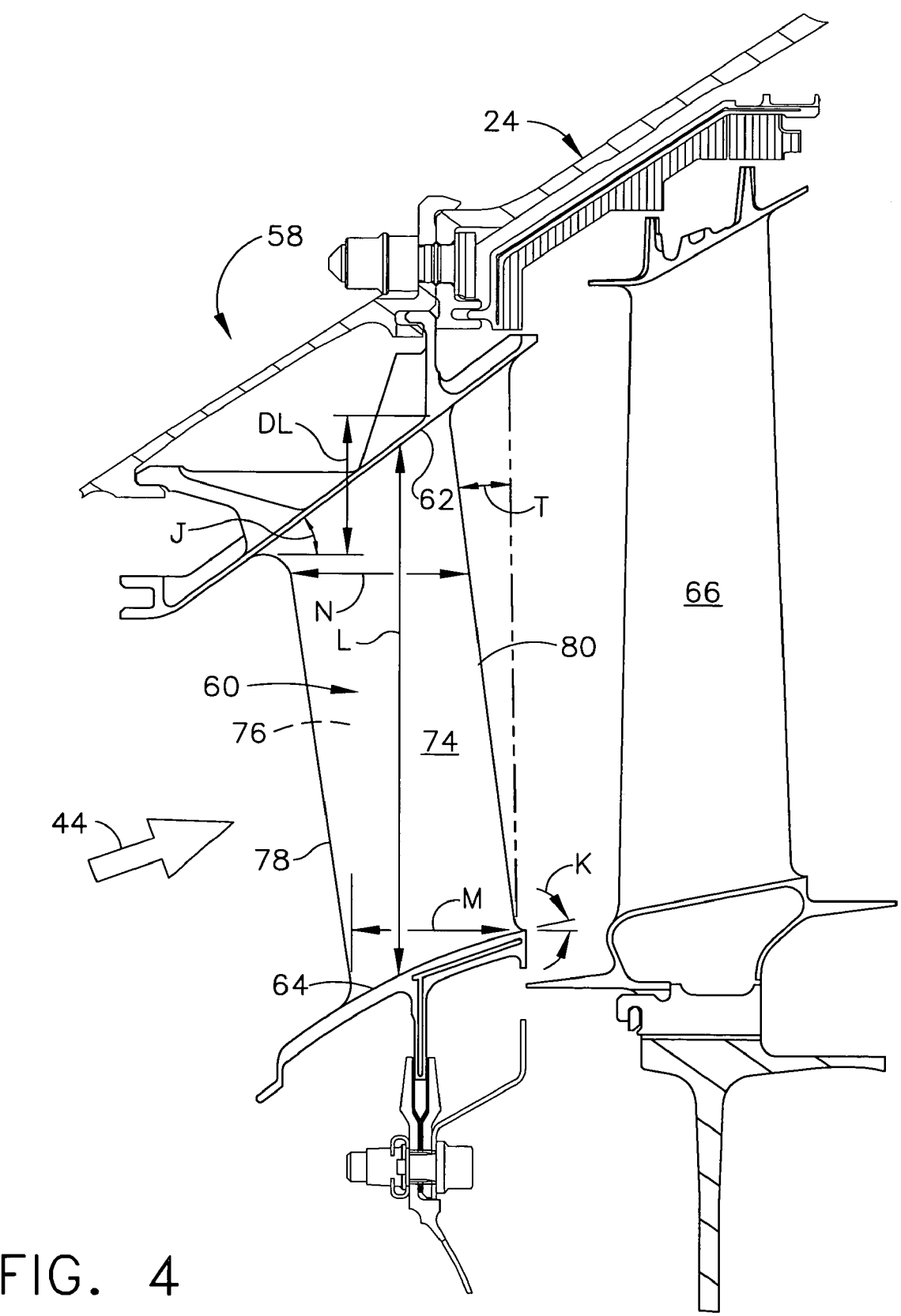
FIG. 4 is an enlarged elevational view of the first stage nozzle and rotor blades in the low pressure turbine illustrated in FIG. 2.

As illustrated in FIGS. 3 and 4, each of the vanes 60 includes a generally concave pressure side 74 and circumferentially opposite, generally convex suction side 76 extending radially in span between the bands 62,64. The two sides also extend axially in chord between opposite leading and trailing edges 78,80.

As shown in FIG. 4, the outer band 62 is inclined outwardly in the downstream direction at an acute inclination angle J. Correspondingly, the inner band 64 is also inclined radially outwardly in the downstream direction at acute inclination angle K. The inclination of the outer band is preferably greater or more than the inclination of the inner band 64 to conform with the radially outward flowpath from the transition duct and the requirement of the LPT to expand the combustion gases for extracting energy therefrom.

As indicated above, the swirl or turning angles of the combustion gases as they flow downstream through the flowpath is affected by the various blades, vanes, and fairings disposed in the flowpath and by the three dimensional configuration thereof. As the flowpath increases in radius and area the combustion gases undergo expansion both axially and radially, and the absolute swirl angles of the combustion gases are simultaneously affected. In general, the higher radius of the flowpath may be used to decrease swirl, whereas an increase in flow area increases swirl, and therefore a balance must be obtained for obtaining the desired amount of swirl while maximizing aerodynamic efficiency of the turbines.

As illustrated in FIG. 3, the individual LP vanes 60 have corresponding arcuate pressure and suction sides, with a corresponding amount of arcuate camber between the leading and trailing edges thereof. The angular orientation of each vane is controlled by the acute twist angle C relative to the centerline axis 30 which is selected for maximizing cooperation with the downstream first stage rotor blades 66, and their corresponding twist angles D.

Illustrated in phantom line in FIG. 4 is a vertical or radial line representative of the typical vertical orientation of the trailing edge in a conventional first stage turbine nozzle for a co-rotating turbofan engine. The inclined bands 62,64 define the outboard boundaries of the combustion gas flowpath in the nozzle and have a divergence ratio defined by the difference in radial span or elevation designated DL between the leading and trailing edges 78,80 at the outer band 62 divided by the average radial span or length between the bands 62,64, designated L, at the various axial locations from the leading edge 78 to the trailing edge 80.

The divergence ratio has been proven by experience to be indicative of the aerodynamic efficiency of a low pressure turbine. In one exemplary conventional design of a first stage turbine nozzle with a vertical trailing edge, the divergence ratio is about 0.40. In a conventional co-rotating turbofan engine this value of divergence ratio corresponds with exceptional aerodynamic efficiency of the corresponding low pressure turbine therein.

However, attempting to simply scale the size of such a conventional first stage turbine nozzle with a vertical trailing edge results in a similar divergence ratio for use in the counterrotating turbofan engine disclosed above, except that this value of the divergence ratio results in excessive aerodynamic losses in the LPT, notwithstanding the mere size scaling of the turbine nozzle.

It has been discovered that the substantial amount of radially outward inclination of the flowpath through the transition duct and the first stage LP nozzle 58 enjoys the benefit of substantial radial expansion of the combustion gases, yet further improvements in the first stage LP nozzle may be introduced for further increasing the aerodynamic efficiency of not only the LPT but also the HPT as previously indicated above.

In particular, the trailing edge 80 of the vanes illustrated in FIG. 4 are inclined or tilted forwardly from the inner band 64 at an acute tilt angle T, about six degrees for example, which correspondingly effects oblique lean at the junction of the tilted trailing edge 80 and the outwardly inclined outer band 62. This simple modification of the LP nozzle illustrated in FIG. 4 permits a substantial reduction in the difference in radial span DL at the outer band 62, which correspondingly reduces the divergence ratio with the average radial span length L to a value substantially below the conventional value of about 0.4. The divergence ratio may be less than or equal to this 0.4 value in various embodiments of the nozzle for additionally increasing the aerodynamic efficiency of the LPT.

In the embodiment of the counterrotating turbofan engine illustrated in FIG. 2, the divergence ratio may be decreased to about 0.2 which represents about a fifty percent reduction in that ratio. Correspondingly, the aerodynamic efficiency of the LPT due to the tilted first stage LP nozzle 58 is increased substantially, and permits a corresponding increase in efficiency of the cooperating HPT. The tilting forward of the vane trailing edge 80 may be used to substantially decrease the axial projected width N of the vane 60 at the outer band 62 relative to the axial projected width M of the vane at the inner band 64.

Correspondingly, the vane leading edges 78 may also be tilted forward from the inner band 64 in an otherwise conventional manner, with the trailing edge tilt conforming similarly with or matching closely the leading edge tilt. For a given tilt of the leading edge 78 the forward tilting of the trailing edge 80 decreases the axial width N and correspondingly decreases the difference in radial elevation DL between the leading and trailing edges at the outer band 62, and correspondingly reduces the divergence ratio based on the average radial span or length of the vanes 60.

The forward tilted vanes 60 better complement the radially outward travel of the combustion gases 44 through the first stage LP nozzle 58 and better complement the radial expansion of the combustion gases as they flow axially between the vanes. Since the outer band 62 is inclined radially outwardly, tilting forwardly the trailing edge 80 decreases the oblique angle between the trailing edge and the outer band and complements the axial direction of the combustion gas streamlines.

The narrower vanes 60 correspondingly remove material from the nozzle and reduce engine weight. Furthermore, the forward tilted trailing edge 80 increases the spacing distance with the leading edge of the first stage LP blades 66 for reducing aerodynamic tip losses thereat as well as reducing the nozzle wake excitation of the downstream blade row.

However, the narrowing of the vanes 60 correspondingly reduces the aerodynamic loading capability of the first stage LP nozzle which must be otherwise addressed. The use of the forward tilted nozzle illustrated in FIG. 4 in a conventional co-rotating turbofan engine would require an increase in the number of vanes 60 for a given amount of aerodynamic loading. However, a net efficiency gain is possible due to the enhanced aerodynamic efficiency of the forward tilted nozzle vanes notwithstanding the increase in number of the vanes and the associated weight therefor.

In the counterrotating turbofan configuration illustrated in FIG. 2, the improved cooperation of the swirl between the HPT and LPT permits the introduction of the narrower forward tilted vanes 60 even with a reduction in vane count. Computational analysis has confirmed the substantial improvement in aerodynamic efficiency of the LPT as a group, as well as the increase in efficiency of the HPT, which significantly improves performance of the counterrotating turbofan engine.

FIGS. 2 and 3 illustrate the substantial difference in configuration between the fairings 52 of the transition duct 50 and the first stage LP nozzle 58. In FIG. 4, the vanes 60 are clearly illustrated as being narrow or slender in axial width between the leading and trailing edges 78,80 which width is substantially less than the radial length L of the vanes or flowpath between the outer and inner bands 62,64.

The vanes and blades of the HPT and the LPT although both designed for extracting energy are nevertheless fundamentally different in size and configuration in view of their relative placement in the engine, and their respective connection to the compressor 18 which is driven at relatively high rotary speed as opposed to the fan driven at a relatively low rotary speed. The first stage LP vanes 60 are necessarily narrow for their use in the LPT and experience a substantially different flow distribution in the rapidly increasing radius at the aft end of the transition duct 50.

The axial width M of the vanes 60 at the inner band 64 may be conventionally sized for the thrust rating of the intended engine and is correspondingly narrow relative to the radial span or length L of the vanes. Correspondingly, the tilting forward of the vane trailing edges 80 substantially reduces the axial width N of the vanes near the outer band 62 creating vanes which are correspondingly narrow both at the outer and inner bands. The outer width N is substantially smaller than it would otherwise be in a conventional nozzle and may be only slightly greater than the inner width M or generally equal thereto.

The exemplary first stage nozzle 58 illustrated in FIG. 4 has an inner band 64 which terminates at an aft end closely adjacent to the vane trailing edges 80 within the small distance of the typical arcuate fillet provided thereat. Correspondingly, the outer band 62 terminates at an aft end with an axial spacing aft from the trailing edges 80, with the aft end of the outer band being vertically or radially aligned generally with the aft end of the inner band 64.

This positions the aft ends of the outer and inner bands closely adjacent to the downstream first stage LP blades 66 for maintaining continuity of the flowpath therebetween. However, the vanes 60 may be conveniently tilted forward at the outer bands 62 for providing the increase in aerodynamic efficiency as described above.

Furthermore, the outer and inner bands 62,64 have corresponding forward ends which commence forwardly from the vanes 60 with an unobstructed axial spacing therewith which is less than about the nominal or average axial width of the vanes between the outer and inner widths N, M.

The short forward extensions of the inner and outer bands illustrated in FIG. 2 complement the correspondingly long outer and inner platforms 54,56 of the transition duct 50 for maintaining continuity of the flowpath therebetween. As shown in FIG. 3, the fairings 52 have generally symmetrical, streamlined profile configured in the duct for efficiently maintaining the swirl of the combustion gases between the second stage HP blades 46 and first stage LP vanes 60, preferably with a slight increase in swirl as described above.

Accordingly, the forward tilted first stage LP nozzle 58 illustrated in FIG. 2 has particular benefits when used in combination with the counterrotating turbofan engine. The HPT 22 firstly channels the combustion gases to the transition duct 50. The transition duct 50 then channels the combustion gases to the first stage LP nozzle 58. The outer band 62 is inclined radially outwardly from the outer platform 54, and the inner band 64 is inclined radially outwardly from the inner platform 56 for continuing the smooth radially outward travel and expansion of the combustion gases into the LPT.

The two-stage HPT 22 permits the intentional introduction of exit swirl in the combustion gases therefrom which are passed through the transition duct with a slight increase in swirl upon reaching the first stage LP vanes 60. This combination of turbine elements, including in particular the forward tilted first stage LP nozzle 58, is effective for substantially increasing efficiency of the turbine stages as indicated above.

Figure 5:
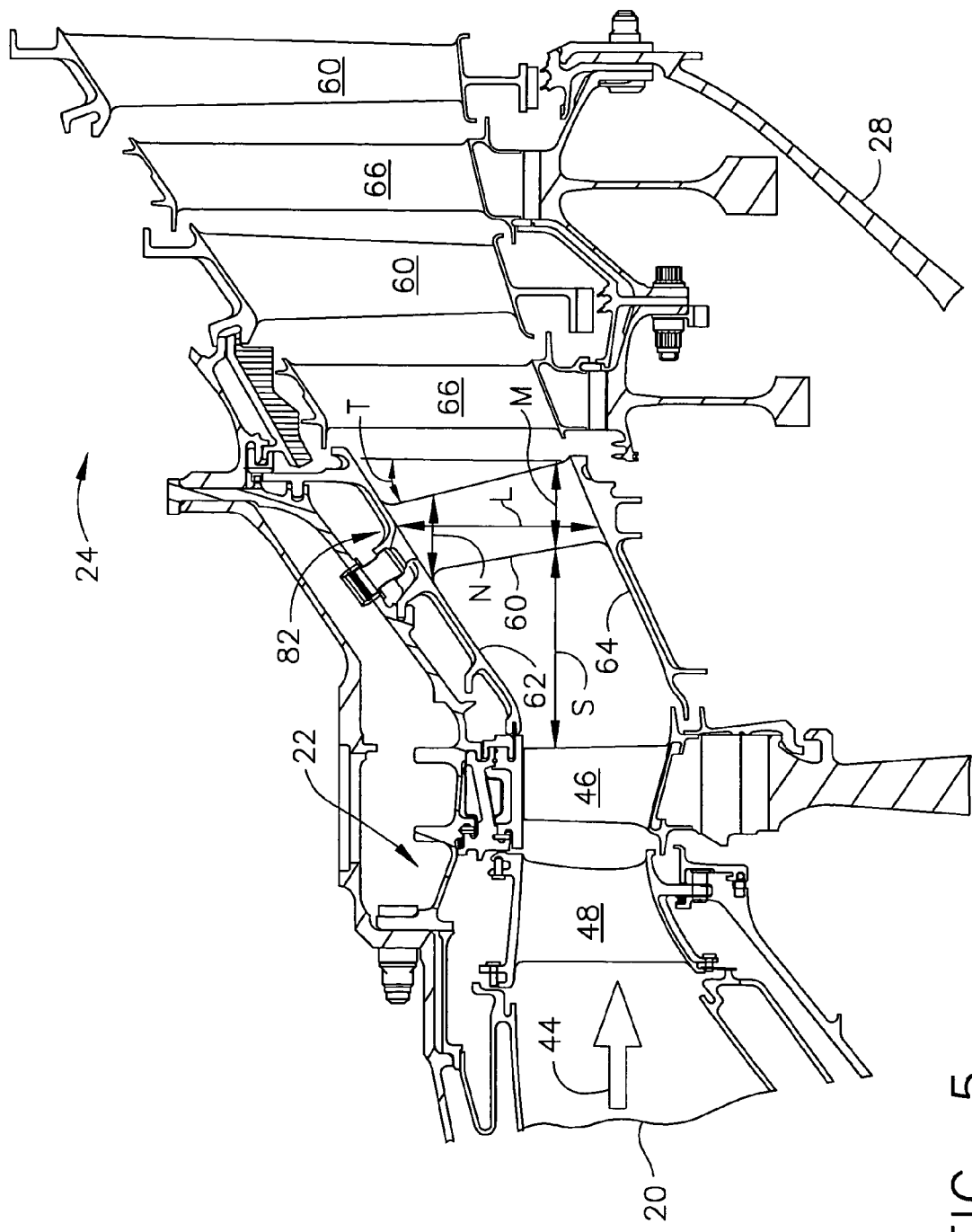
FIG. 5 is an axial sectional view, like FIG. 2, of the high and low pressure turbines illustrated in FIG. 1 in accordance with another embodiment

Illustrated in FIG. 5 is an alternate embodiment of the counterrotating turbofan engine illustrated in FIG. 1 which includes a modified LPT 24. The LPT includes a first stage LP nozzle, designated 82, that enjoys the advantages of the forward tilted vanes 60 as disclosed above with respect to FIG. 4, but in combination with the HPT 22 and with the first stage LP nozzle 82 being disposed directly between the corresponding stages of the rotor blades 46 and 66 in the HPT and the LPT without the transition duct 50 or the midframe 68 therebetween.

In this embodiment, the outer and inner bands 62,64 are axially longer than in the previous embodiment and commence at forward ends spaced forwardly from the row of vanes 60 at an axial spacing S which is greater than the nominal or average axial width of the vanes 60. For example, the axial spacing or extension of the bands 62,64 in front of the vanes 60 may be equal to about the average radial span or length L of those narrow vanes 60. In this way, the forward extensions of the two bands 62,64 provide an unobstructed transition duct between the last stage HP blades 46 and the first stage LP vanes 60.

In this embodiment, the HPT 22 includes a single stage of the HP rotor blades 46 cooperating with the single stage HP nozzle vanes 48. The radially outer and inner bands 62,64 of the first stage LP nozzle 82 are inclined radially outwardly and diverge from each other, with the outer band having a greater inclination angle than the inner band. The LPT 24 includes five stages, with only the first few being illustrated in FIG. 5, and this turbofan engine is sized for a different application.

Nevertheless, the counterrotation of the rotors in the HPT and the LPT permit a significant increase in aerodynamic efficiency of the LPT and HPT as described above, which is due in large part to the use of the forward tilted first stage LP nozzle 82.

In the various embodiments of the first stage LP nozzle disclosed above, the forward tilted trailing edge comes at a cost requiring a tradeoff. The tilted trailing edge reduces the effective surface area of the vanes available for turning the flow under corresponding aerodynamic loading. Accordingly, the forward tilted nozzle has best utility and best ability for increasing aerodynamic efficiency of turbines in the counterrotating turbofan engine.

FIGS. 2 and 5 illustrate alternate embodiments of the first stage LP nozzle 58,82 for use in counterrotating turbines which use to advantage the increased swirl provided by the HPT and the relatively low camber first stage LP vanes 60. The counterrotation of the turbines permit a substantial reduction in airfoil count of the first stage LP nozzle, as well as a reduction in airfoil count of the last stage HP blades. The tilted forward nozzle design limits the reduction in airfoil count, but nevertheless can result in a substantial improvement in efficiency of the turbines and in the turbofan engine itself.

In a conventional co-rotating turbofan engine, the forward tilted first stage LP nozzle may be used for increasing efficiency of the turbines to a lesser amount, with the loss in loading area due to the narrower vanes being correspondingly offset by an increase in the number of vanes in the first stage LP nozzle. The increased airfoil count adds weight to the engine and requires a tradeoff of the various competing objectives in the design to determine the final efficacy of introducing the forward tilted first stage LP nozzle therein.

In a two-spool turbofan engine, performance of the HPT and the downstream LPT are clearly interrelated as described above and affect overall performance of the engine. Counterrotation of the rotors of the HPT and the LPT permits a new configuration for the turbofan engine having increased aerodynamic efficiency.

In particular, the first stage LP nozzle significantly affects performance of the LPT, as well as performance of the HPT disposed upstream therefrom. The improvement in design of these components provides a synergistic improvement of efficiency due to the first stage LP nozzle itself, in combination with the stages of the LPT downstream therefrom, as well as in combination with the HPT disposed upstream therefrom with and without the separate transition duct therebetween.

This synergy also includes a significant reduction in engine weight due to the reduction in airfoil count in the turbines. And, the tilted forward first stage LP nozzle may reduce overall length of the engine, which has a further synergistic affect in reducing weight of the engine in the various other components within the juncture between the shorter first stage LP nozzle and the downstream stages of the LPT.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine stator nozzle comprising:
   a row of vanes joined at opposite ends to outer and inner bands;
   each of said vanes having a concave pressure side and circumferentially opposite, convex suction side extending radially in span between said bands and axially in chord between opposite leading and trailing edges;
   said inner band being inclined outwardly between said leading and trailing edges and said outer band being correspondingly inclined more than said inner band, with said vanes having camber for turning combustion gases between said leading and trailing edges, and also having an acute twist angle for imparting swirl in said combustion gases discharged at said trailing edges; and
   said trailing edges being tilted forwardly from said inner band with oblique lean at said outer band to narrow said vanes in axial width at said outer band and correspond generally in axial width of said vanes at said inner band.

2. A nozzle according to claim 1 wherein said inclined bands have a divergence ratio defined by the difference in radial span between said leading and trailing edges at said outer band divided by the average radial span between said bands from said leading edge to said trailing edge, with said ratio being less than about 0.4.

3. A nozzle according to claim 2 wherein said vane leading edges are also tilted forward from said inner band, and said trailing edge tilt conforms with said leading edge tilt.

4. A nozzle according to claim 3 wherein said inner band terminates closely adjacent to said vane trailing edges, and said outer band terminates with a spacing aft from said trailing edges vertically aligned with said inner band.

5. A nozzle according to claim 3 wherein said vane trailing edges are inclined at a common tilt angle from said inner band to said outer band.

6. A turbofan engine comprising:
   a fan driven by a low pressure turbine, and a compressor following said fan and driven by a high pressure turbine preceding said low pressure turbine in counterrotation therewith;
   said low pressure turbine including a first stage stator nozzle including a row of vanes joined at opposite ends to radially outwardly inclined outer and inner bands;
   each of said vanes having arcuate camber between leading and trailing edges thereof, and an acute twist angle for imparting swirl in combustion gases channeled between said high pressure turbine and said low pressure turbine; and
   said trailing edges being tilted forward from said inner band with oblique lean at said outer band.

7. An engine according to claim 6 wherein said inclined bands have a divergence ratio defined by the difference in radial span between said leading and trailing edges at said outer band divided by the average radial span between said bands from said leading edge to said trailing edge, with said ratio being less than about 0.4.

8. An engine according to claim 7 wherein said vanes are narrow in axial width between said leading and trailing edges with said width being less than the radial length between said outer and inner bands.

9. An engine according to claim 8 further comprising a transition duct having a row of fairings disposed axially between said high pressure turbine and said first stage nozzle, and wherein said high pressure turbine includes two stages of rotor blades therein.

10. An engine according to claim 8 wherein said first stage nozzle is disposed directly between corresponding stages of said rotor blades in said high pressure turbine and said low pressure turbine, and said high pressure turbine includes a single stage of said rotor blades therein.

11. A turbine stator nozzle comprising:
a row of vanes joined at opposite ends to outer and inner bands;
each of said vanes having a concave pressure side and circumferentially opposite, convex suction side extending radially in span between said bands and axially in chord between opposite leading and trailing edges;
said bands being inclined outwardly between said leading and trailing edges, with said vanes having camber for turning combustion gases between said leading and trailing edges, and also having an acute twist angle for imparting swirl in said combustion gases discharged at said trailing edges; and
said trailing edges being inclined forwardly from said inner band at an acute tilt angle to effect oblique lean at said outer band with greater spacing aft of said trailing edges at said outer band than at said inner band.

12. A nozzle according to claim 11 wherein said outer band is inclined more than said inner band.

13. A nozzle according to claim 12 wherein said vanes are narrow in axial width between said leading and trailing edges with said width being less than the radial length between said outer and inner bands.

14. A nozzle according to claim 13 wherein said vanes are correspondingly narrow at both said outer and inner bands.

15. A nozzle according to claim 13 wherein said vane leading edges are also tilted forward from said inner band, and said trailing edge tilt conforms with said leading edge tilt.

16. A nozzle according to claim 13 wherein said inclined bands have a divergence ratio defined by the difference in radial span between said leading and trailing edges at said outer band divided by the average radial span between said bands from said leading edge to said trailing edge, with said ratio being less than about 0.4.

17. A nozzle according to claim 16 wherein said divergence ratio is about 0.2.

18. A nozzle according to claim 13 wherein said inner band terminates closely adjacent to said vane trailing edges, and said outer band terminates with a spacing aft from said trailing edges vertically aligned with said inner band.

19. A nozzle according to claim 18 wherein said outer and inner bands commence forwardly from said vanes with a spacing less than about the nominal width of said vanes.

20. A nozzle according to claim 18 wherein said outer and inner bands commence forwardly from said vanes with a spacing greater than about the nominal width of said vanes.

21. A nozzle according to claim 13 in combination with a high pressure turbine disposed upstream from said vanes for channeling said combustion gases thereto, and a multistage low pressure turbine commencing with said vanes for extracting energy from said combustion gases.

22. A combination according to claim 21 wherein said high pressure turbine includes rotor blades joined to a first rotor, and said low pressure turbine includes rotor blades joined to a second rotor, with said blades being oppositely oriented for counterrotating said first and second rotors.

23. A combination according to claim 22 further comprising a transition duct having a row of fairings disposed axially between said high pressure turbine and said turbine nozzle.

24. A combination according to claim 23 wherein said transition duct includes radially outwardly inclined outer and inner platforms supporting said fairings, with said outer band being inclined radially outwardly from said outer platform, and said inner band being inclined radially outwardly from said inner platform.

25. A combination according to claim 24 wherein said high pressure turbine includes two stages of rotor blades therein.

26. A combination according to claim 22 where said turbine nozzle is disposed directly between corresponding stages of said rotor blades in said high pressure turbine and said low pressure turbine.

27. A combination according to claim 26 wherein said outer and inner bands commence forwardly from said vanes with a spacing equal to about the average radial span of said vanes.

28. A combination according to claim 26 wherein said high pressure turbine includes a single stage of said rotor blades therein.

* * * * *